(12) United States Patent
Rangne et al.

(10) Patent No.: US 9,559,943 B2
(45) Date of Patent: Jan. 31, 2017

(54) NETWORK COMMUNICATION REDUNDANCY METHOD

(71) Applicant: NET INSIGHT INTELLECTUAL PROPERTY AB, Stockholm (SE)

(72) Inventors: Göran Rangne, Skarpnack (SE); Martin Karlsson, Stockholm (SE)

(73) Assignee: NET INSIGHT INTELLECTUAL PROPERTY AB, Stockholm (SE)

( * ) Notice: Subject to any disclaimer, the term of this patent is extended or adjusted under 35 U.S.C. 154(b) by 131 days.

(21) Appl. No.: 14/366,501

(22) PCT Filed: Jan. 16, 2013

(86) PCT No.: PCT/EP2013/050735
§ 371 (c)(1),
(2) Date: Jun. 18, 2014

(87) PCT Pub. No.: WO2013/107767
PCT Pub. Date: Jul. 25, 2013

(65) Prior Publication Data
US 2014/0347981 A1    Nov. 27, 2014

(30) Foreign Application Priority Data
Jan. 17, 2012  (SE) .................................. 1250025-2

(51) Int. Cl.
*H04L 1/00*         (2006.01)
*H04L 12/707*       (2013.01)
*H04L 1/22*         (2006.01)
*H04L 12/24*        (2006.01)
*H04L 12/879*       (2013.01)
*H04L 12/861*       (2013.01)

(52) U.S. Cl.
CPC ................. *H04L 45/24* (2013.01); *H04L 1/22* (2013.01); *H04L 41/0659* (2013.01); *H04L 49/901* (2013.01); *H04L 49/9057* (2013.01)

(58) Field of Classification Search
None
See application file for complete search history.

(56) References Cited

U.S. PATENT DOCUMENTS

| 5,627,822 A | 5/1997 | Edmaier et al. |
| 6,282,669 B1 | 8/2001 | Imanaka et al. |
| 2009/0086735 A1* | 4/2009 | Tsang ............... H04L 1/1874 370/394 |

FOREIGN PATENT DOCUMENTS

EP    0854610 A2   7/1998

OTHER PUBLICATIONS

International Search Report PCT/ISA/210 for International Application No. PCT/EP2013/050735 Dated May 29, 2013.

* cited by examiner

*Primary Examiner* — Minh-Trang Nguyen
(74) *Attorney, Agent, or Firm* — Harness, Dickey & Pierce, PLC

(57) ABSTRACT

There is provided an improved redundancy method for a communication network. The invention is based on the insight that a hitless failover can be performed by at the receiving node using a single common indexed play-out buffer in which a selective reconstruction of the transported data stream utilizing individual pieces, i.e. frames or packages, of a data stream received over multiple links is performed.

14 Claims, 8 Drawing Sheets

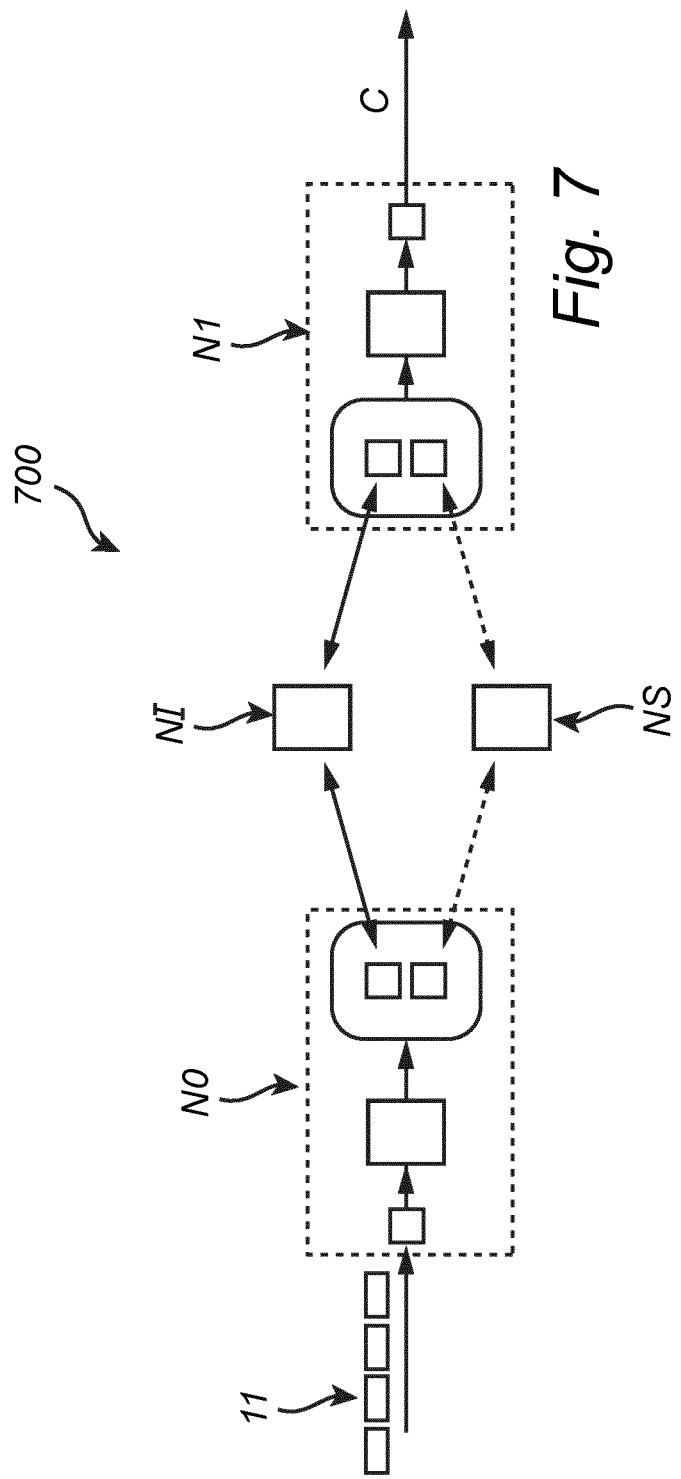

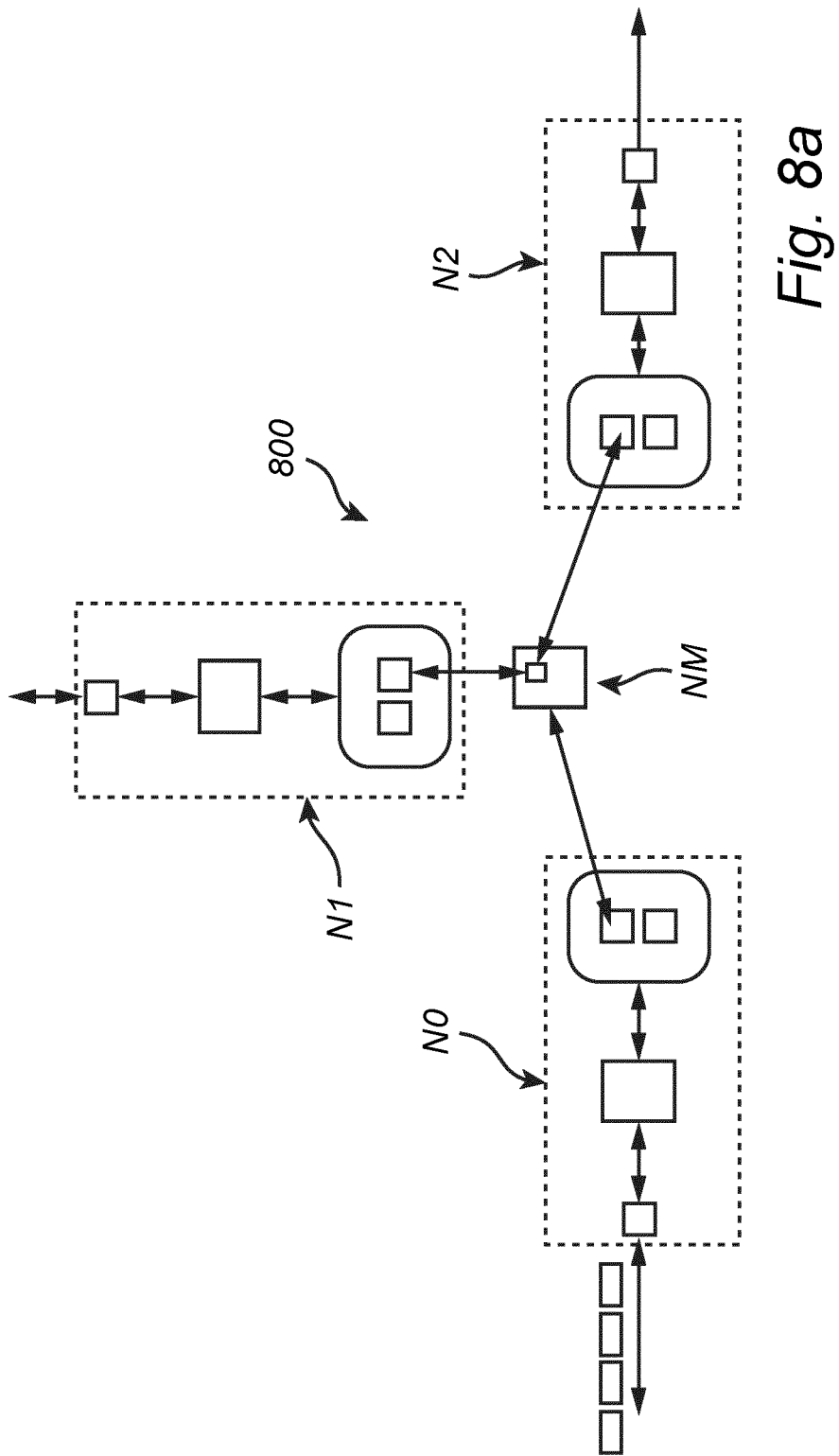

NETWORK COMMUNICATION REDUNDANCY METHOD

TECHNICAL FIELD

The present invention relates to the field of redundancy methods for network communication, and more particularly to a communication method based on node to node transfer of a data stream over at least two links.

BACKGROUND OF THE INVENTION

A standard approach to increase redundancy in a node to node communication for connections in a communication network, such as an Asynchronous Serial Interface (ASI) connection or an Ethernet connection, is to use duplicated transmission paths, channels or links, between the communicating nodes, which herein after is referred to as a 1+1 connection. Typically, a receiving node is arranged to receive replicas of a data stream, a stream of packets, from a transmitting node. The replicated data streams are transported via a main link and via a backup link to the receiving node. Note that a link may refer to a sequence of intermediate node to node communications. Based on the quality or status of the communication over the respective link, a select mechanism in the receiving node determines which one of the links should be selected as a main link from which an output data stream of the node is forwarded to another node or an application associated with the node. Thus, the general idea of such 1+1 connection is that if the main link suffers a malfunction, a failover can be performed to the backup link. However, due to for instance different time delays for the communication over the main link and the backup link, if the main link suddenly malfunctions, hits in the form of data loss or duplicated data in the forwarded data stream are normally incurred at the failover.

Instead of switching the communication link as a whole at a malfunction, it has been shown that the selection of which replicated data to forward can be performed on basis of identifiers included in the respective packets of a data stream. European Patent Application Publ. No. EP 0854 610 A2 discloses a redundancy method for an Ethernet communication between a plurality of nodes which are connected to each other through a first and a second independent Ethernet communication line. Identical data packets, each to which a data identifier for identifying data contents has been added, are transferred from a transmitting node to a receiving node over both communication lines. At reception, data transferred over the first and the second link is temporarily stored in a respective buffer, and in the receiving node it is determined on basis of the data identifier, which data transferred over the two respective communication lines that has arrived first, and which is therefore accepted as first reception data for further use. This provides a redundancy method with minimized introduced delay for the respective data portions while maintaining redundancy in the connection.

SUMMARY OF THE INVENTION

In view of the above, an object of the invention is to provide an improved redundancy method for a communication network. In particular, an object is to provide hitless node to node communication over multiple links which is scalable with respect to the number of incoming links to a node, i.e. to which links can be added or removed without loss of functionality or need for substantial reconstruction of the node.

This object is achieved by a method for node to node communication according to the present invention as defined in claim 1. The invention is based on the insight that a hitless failover can be performed in a precise manner such that no data is duplicated or lost during node to node transfer by at the receiving node using a single common indexed play-out buffer in which a selective reconstruction of the transported data stream utilizing individual pieces, i.e. frames or packages, of a data stream received over multiple links is performed.

Thus, in accordance with an aspect of the present invention, there is provided a method for node to node communication comprising providing each packet of a data stream to be transferred with a respective identifier, and transporting over at least two links replicated data of the data stream from a transmitting node to a receiving node. Further, the method comprises, at the receiving node, selectively receiving and buffering packets from the at least two links for subsequent forwarding of the data stream. The identifier corresponds to a relative position of a packet in the data stream, and the step of buffering comprises reconstructing using received packets from at least one of the at least two links a predetermined portion of the data stream in a common indexed buffer.

The present method is advantageous in that it can be implemented in relatively instable networks, e.g. a packet lossy Ethernet network containing low performing links. Since the data stream is transported between nodes over multiple links, and is reconstructed in the common buffer of each receiving node by adding missing packages of a data stream of a link from one of the parallel links, the quality requirement on each individual link is decreased. Note that it may be more economical to transport data over three less stable links, than over two or one more stable links due to link lease pricing. Further, utilizing a common buffer to recreate the transferred data stream advantageously provides an easily scalable system, in which the number of incoming links to a receiving node can be varied without requiring a reconfiguration of the receiving node.

A further advantage with using a common indexed buffer for reconstruction of the transferred data stream is that the required allocated buffer space in the receiving node is substantially decreased. When utilizing a common shared buffer, for the example of having two incoming links, the minimum required buffer capacity required for reconstruction of the data stream is half the size, as compared to the known system. Further, the required buffering capacity is typically dictated by the actual or estimated differential delays of the incoming links, i.e. the temporal offset between different replicated data streams over the at least two links. For example, if a packet with a specific identifier arrives 5 ms later on one link than on a parallel link, the connection is said to have a differential delay of 5 ms. This must be compensated for by buffering the corresponding time portion of the data stream to provide a hitless connection. For the example above with two incoming links, when a receiving node has a limited total buffer space, twice the hitless tolerance with respect to buffering for compensation of the differential delay can be achieved, as compared to the known system in which buffering of all packets received from all links is done.

According to an embodiment of the method, the step of reconstructing at least a portion of the data stream comprises selecting for writing to each indexed position of the buffer only one received packet with a specific identifier. A plurality of packets with a specific identifier may arrive to the node on different links. However, since the reconstruction of the data stream only requires one copy of the packet with that specific identifier, when one copy has been written to the common buffer, other copies thereof can be discarded. Which copy to select may be based on a current selection strategy, e.g. first to arrive, most reliable link etc.

Further, this provides hitless node to node communication over multiple links with an improved handling of near zero differential delays between the incoming links, which the prior art solutions described above may have difficulties in handling in a hitless fashion. This is due to the fact that when the differential delays between multiple incoming links are small, the actual first to arrive link may vary in time, which in turn provides difficulties in determining which link is first to arrive (main link), how much buffering must be done to provide hitless failover, and when the node to node communication is in a hitless state.

According to an embodiment of the method, the method comprises for each received packet, determining based on the identifier of the received packet a corresponding buffer index, checking based on the determined buffer index if data has been written to the corresponding buffer index position, and if not written to: writing the received packet or a corresponding pointer to the received packet to its determined buffer index position. This effectively enables sorting of packets having specific identifiers and arriving on the incoming links, into a correct buffer index position in the buffer, even when the incoming packets arrive in mixed order. Only packets which have not yet been written into the buffer are selected for writing.

According to an embodiment of the method, it further comprises dropping any received packet arriving after a received packet with the same identifier is recorded, thereby recovering memory.

According to an embodiment of the method, simultaneous selection and writing to the buffer of received packets having different identifiers and being received on different links is supported. This concurrent writing to the common buffer advantageously increases the speed of writing of data into the buffer, and thereby decreases time needed to perform the reconstruction of the data stream portion.

According to an embodiment of the method, it further comprises for each received packet setting a valid bit entry corresponding to a determined buffer index and link. This provides an effective way of monitoring which packets have been received on which link, which may be utilized e.g. for quality monitoring of the incoming links and detection of hitless failover capability.

According to an embodiment of the method, it further comprises monitoring a current redundancy of the node to node communication based on the valid bit entries, which is advantageous for complexity reasons. The valid bit entries may further be used for monitoring if the common buffer is sufficiently filled such that a hitless failover can be executed if one or more link fails.

According to an embodiment of the method, it further comprises, at the receiving node for each received packet, recording an inter-packet arrival time. The forwarding of the data stream is performed with an output rate determined based on recorded inter-packet arrival time data, which is advantageous for minimizing introduction of jitter/wander effects in the transferred data stream. This is of importance e.g. when implementing the method in an Ethernet transport format, and in other formats or services in which the packet arrival rate to a node is not fixed, e.g. video services over Ethernet networks.

According to an embodiment of the method, the output rate is determined packet by packet, such that for a packet of a specific buffer index the output rate is selected based on a recorded inter-packet arrival time of one of the received packets having an identifier corresponding to the specific buffer index, which is advantageous to ensure that the packets are forwarded in a way that ensures the same jitter/wander characteristics as of the originating data stream According to an embodiment of the method, the output rate when forwarding the data stream is selected based on recorded inter-packet arrival times from one of the at least two links, which is advantageous when there is a need to enforce a primary timing link to achieve a specific output rate of the forwarded data stream. This ensures that the send out timing of the forwarded data stream becomes the same as one of the incoming at least two data streams and not a random mix.

According to an embodiment of the method, forwarding of the data stream is initiated a predetermined time after a first packet of the data stream has been received on at least two links.

According to an embodiment of the method, it may be utilized to enable hitless node upgrades of an intermediary node arranged in one of the at least two links in a network, thereby enabling hitless take downs of the intermediary node for maintenance without interrupting services According to an aspect of the invention, the present method is advantageously implemented as a software module adapted to perform the method as described above executed by a computer processor.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 7 and 8 are schematic illustrations of hitless disconnection of a node in a network by utilizing the present inventive method.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Exemplifying embodiments of the method for node to node communication according to the present invention is now described with reference to the figures. In most of the exemplifying embodiments a 1+1 connection is illustrated. However, it should be noted that the mechanism described also applies to 1+1+1 connections and so forth. The steps of the method are shown as a numerical sequence, however some of the steps may be performed in another order. The term packet or frame is used as data granularity throughout this document, although the data may not be transported in a per se packetized format in all cases.

Figure 1:
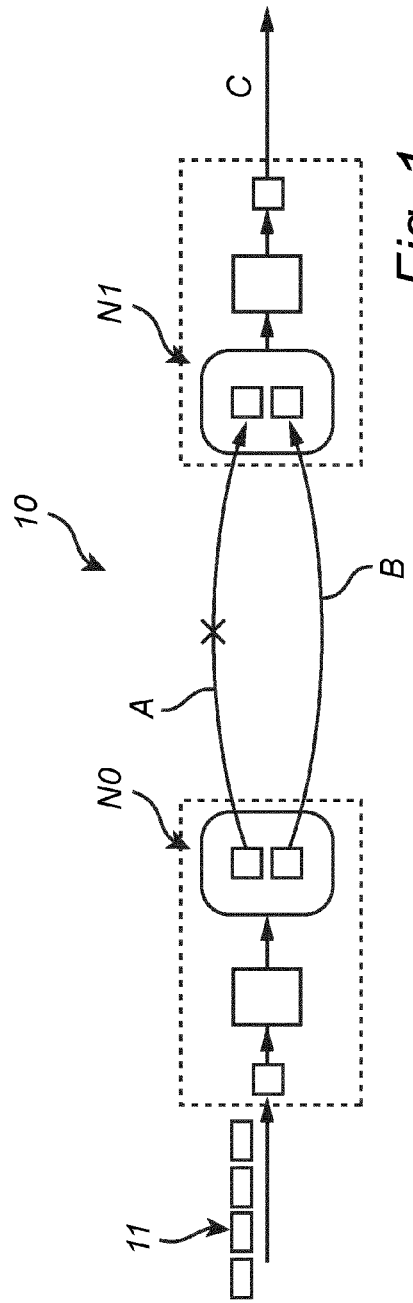
FIG. 1 is a schematic overview of a node to node communication system according to the present invention.

FIG. 1 is a schematic illustration outlining a node to node communication system 10 according to the present inventive concept. The communication system 10 here comprises a hitless 1+1 Ethernet connection employing a method for node to node communication according to the present invention. The node to node communication system 10 comprises a first node N0 and a second node N1 which are interconnected via two parallel links, A and B. Each node comprises means for receiving, processing and transmitting a data stream. However, for sake of simplicity only those functional components necessary for understanding the invention are shown and described herein.

A data stream 11 to be transferred between the first node N0 and the second node N1 contains a sequence of packages. Each package of the data stream 11 is in the first node N0, provided with an identifier corresponding to a relative position of the package in the data stream 11. The identifier may be a sequence number selected within a predetermined interval. However, according to embodiments of the method, the identifier may be implemented as any form of time stamp in the egress direction of the data stream transfer.

Further, after being provided with an identifier n, each indexed package is subsequently replicated in the first node N0 such that identical data, i.e. duplicated packets containing the same sequence number n for the packet, is transferred from the first node N0 to the second node N1 over the first link A and the second link B, respectively, i.e. from the transferring node to the receiving node. At the second node N1, the transferred copies of the data stream packages from both links, A and B, are received and selectively rejected or buffered in a common buffer (not shown in FIG. 1, see e.g. a common buffer which is schematically illustrated as a table 120 in FIG. 2) for subsequent forwarding of the data stream on (an outgoing) link C. The common buffer 120, a single shared play-out buffer, is here indexed by sequence numbers $b_n$ and can be simultaneously written to by both links A and B.

Figure 2:
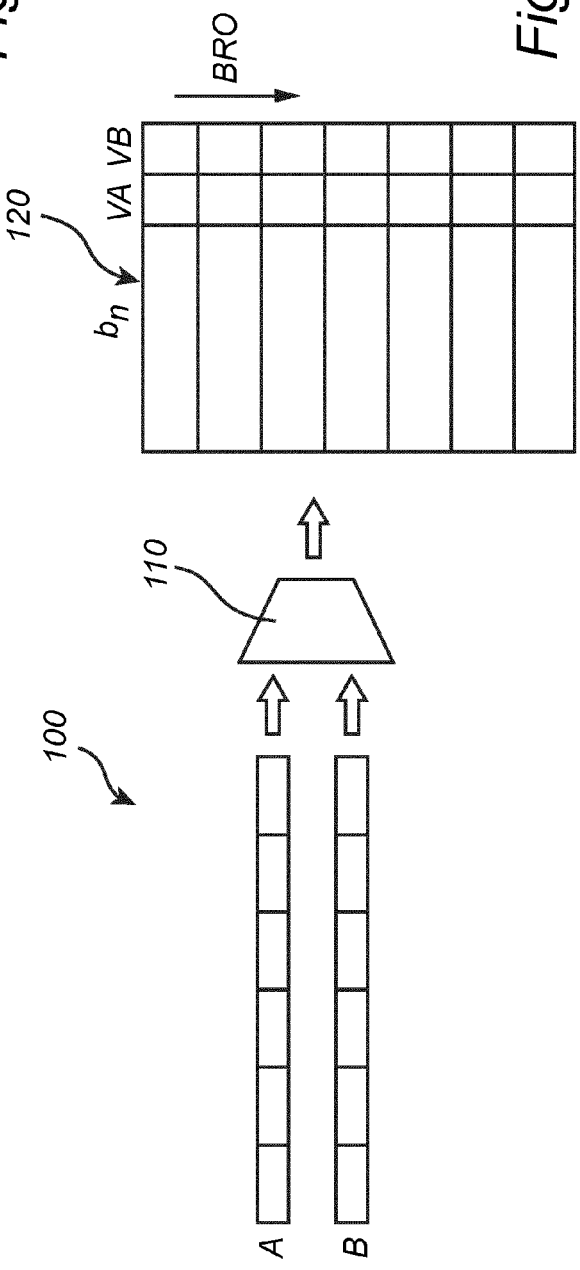
FIGS. 2-6 are schematic illustrations of the functional structure of embodiments of the present inventive method.

Embodiments of the method described herein will now be explained in more detail, and with reference to a basic functional structure illustrating the present inventive method, as schematically illustrated in FIG. 2. The basic functional structure 100 here consist of two incoming links A and B (although the method supports any applicable number of links A, B, . . . Z), a select unit 110 where each incoming link is terminated from a performance monitoring perspective, and a play-out buffer 120 (corresponding to a common indexed buffer arranged in the receiving node N1 as described with reference to FIG. 1). Each packet in the data transmitted over links A and B contains a respective sequence number, which is written into the packets of the data stream in the transmitting node. Each packet of each sequence number is here referred to as for link A: A(n), and for link B: B(n).

The play-out buffer 120 is a circular array that is indexed. The play-out buffer 120 further comprises a valid bit per entry per link, VA and VB, and a play-out buffer index $b_n$. The select unit 110 comprises means for determining based on each received packet identifier, i.e. the packet sequence number, a corresponding play-out buffer index $b_n$ for that packet. This is done by the select unit 110 detecting an entry, e.g. a received packet or packet, from link A or B, and computing a corresponding play-out buffer index $b_n$ for the entry by comparing the offset from the packet sequence number of the play-out buffer head entry and the received sequence number. Further for each entry, if the valid bit per entry per link, VA and VB, are both cleared, the packet is written into the play-out buffer (not shown) and the links valid bit, VA or VB, for that play-out buffer index $b_n$ is set. If for a specific entry of a link the other link's valid bit for that play-out buffer index $b_n$ is already set, i.e. the other link has already filled in the entry and the packet has already been written into the play-out buffer, the packet of the specific entry is dropped after setting its valid bit. In FIG. 2, the play-out buffer read order BRO when forwarding the data stream to link C is indicated.

Figure 3:
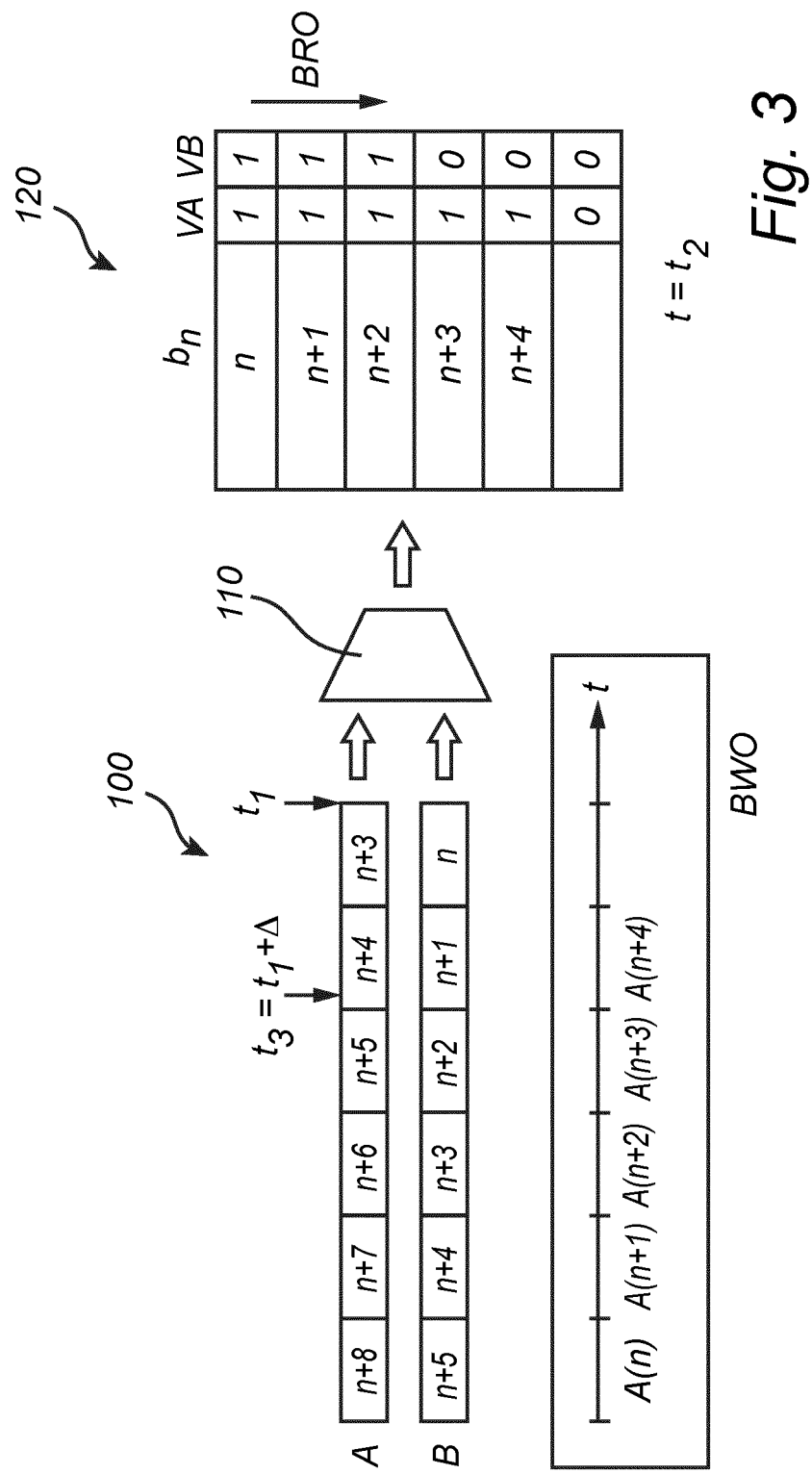

Consider now an example of play-out buffer filling as illustrated in FIG. 3. Link A is ahead of link B, i.e. the sequence numbers of the packets from link A as detected by the select unit 110 is greater than from link B. The packets from link A get written into the play-out buffer one by one. At a time $t_1$, A(n+3) arrives at the select unit 110, the packet of A(n+3) gets written into the play-out buffer 120, and the valid bit for play-out buffer index $b_n$ corresponding to that sequence number (n+3) is set for link A (VA=1 for $b_n$=n+3). At a time $t_2$, the play-out buffer 120 has been written up to A(n+4), but as can be seen in the valid bits VB for link B, only B(n), B(n+1) and B(n+2) has been received on link B, at which the corresponding valid bits are set and the corresponding packets dropped since they were already received by link A. The play-out buffer write order BWO, as illustrated in FIG. 3, then becomes A(n), A(n+1), A(n+2), A(n+3), A(n+4).

In a 1+1 connection the differential delay Δ is the measured arrival time differential between the two copies of a duplicated packet sent over different links. It is key that the play-out buffer is large enough such that the differential delay Δ between different links can be covered. Referring again to FIG. 3, packet B(n+3) from link B here arrives to the select unit 110 at a time $t_3=t_1+\Delta$, and since the play-out buffer is already written by link A, the packet for B(n+3) will be dropped after setting the valid bit for play-out buffer index VB for play-out buffer index $b_n$ corresponding to that sequence number (n+3) (VB=1 for $b_n$=n+3 at a time >$t_3$). In case the ahead link A fails for some reason, and do not deliver A(n+3), the buffering in the play-out buffer must be arranged to cover the differential delay Δ between link A and B, such that when B(n+3) arrives, it can be used to fill in the missing packet and recover the data stream, see the next example.

Figure 4:
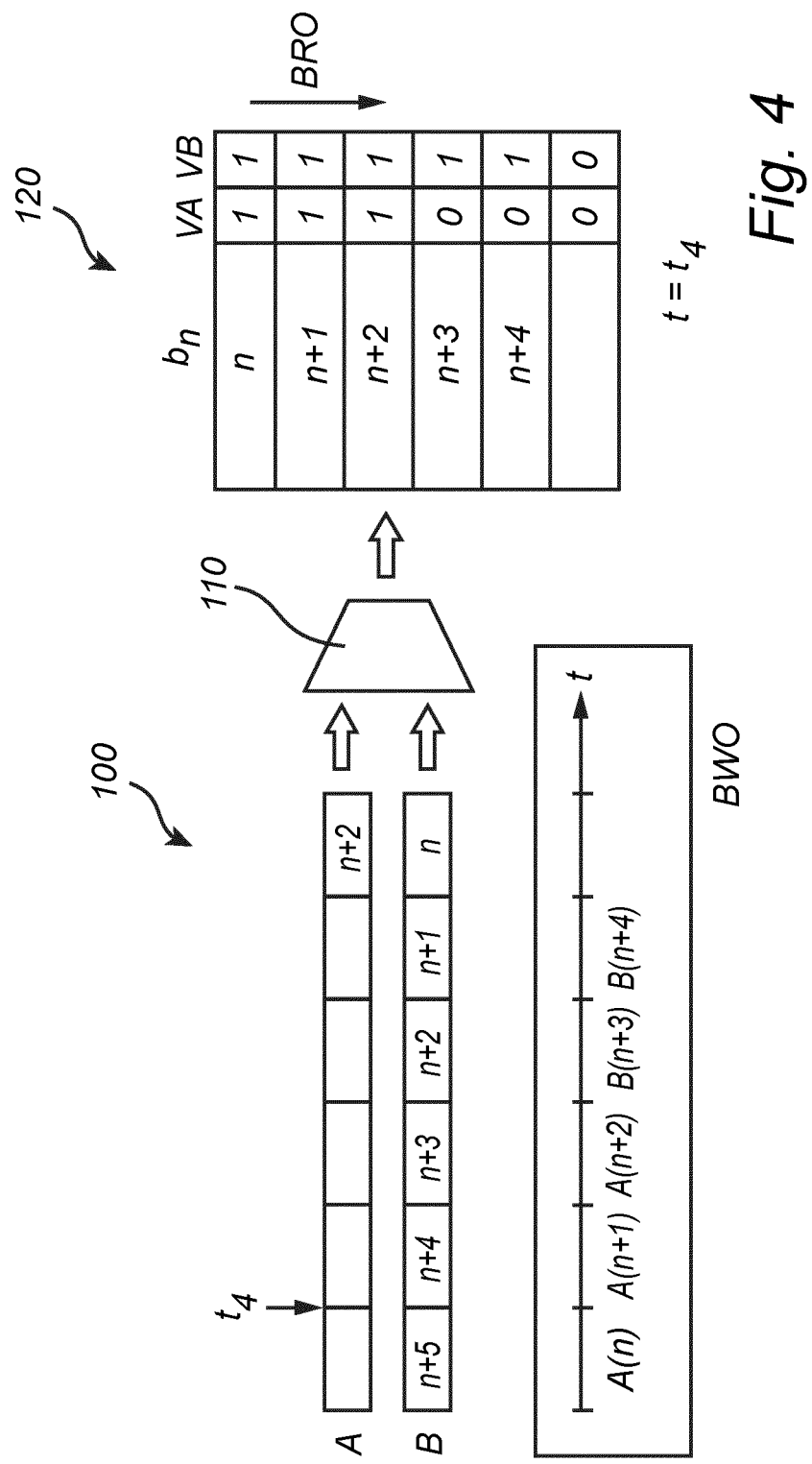

In FIG. 4, an example highlighting a hitless failover is illustrated. As shown in FIG. 4, link A is here ahead of link B, i.e. the sequence numbers of the packets from link A as received by the select unit 110 is greater than from link B. Here link A experiences a fault, i.e. no valid packets are received from link A after A(n+2), however, since link A is ahead of link B, the select unit 110 writes packets A(n), A(n+1), A(n+2) into the play out buffer. As can be seen in FIG. 4, link B will eventually catch up and start filling in the play-out buffer entries, starting with sequence number (n+3). Thereby a hitless failover of the link to link communication is achieved. The play-out buffer write order BWO order then becomes A(n), A(n+1), A(n+2), B(n+3), B(n+4) as indicated in FIG. 4.

Figure 5:
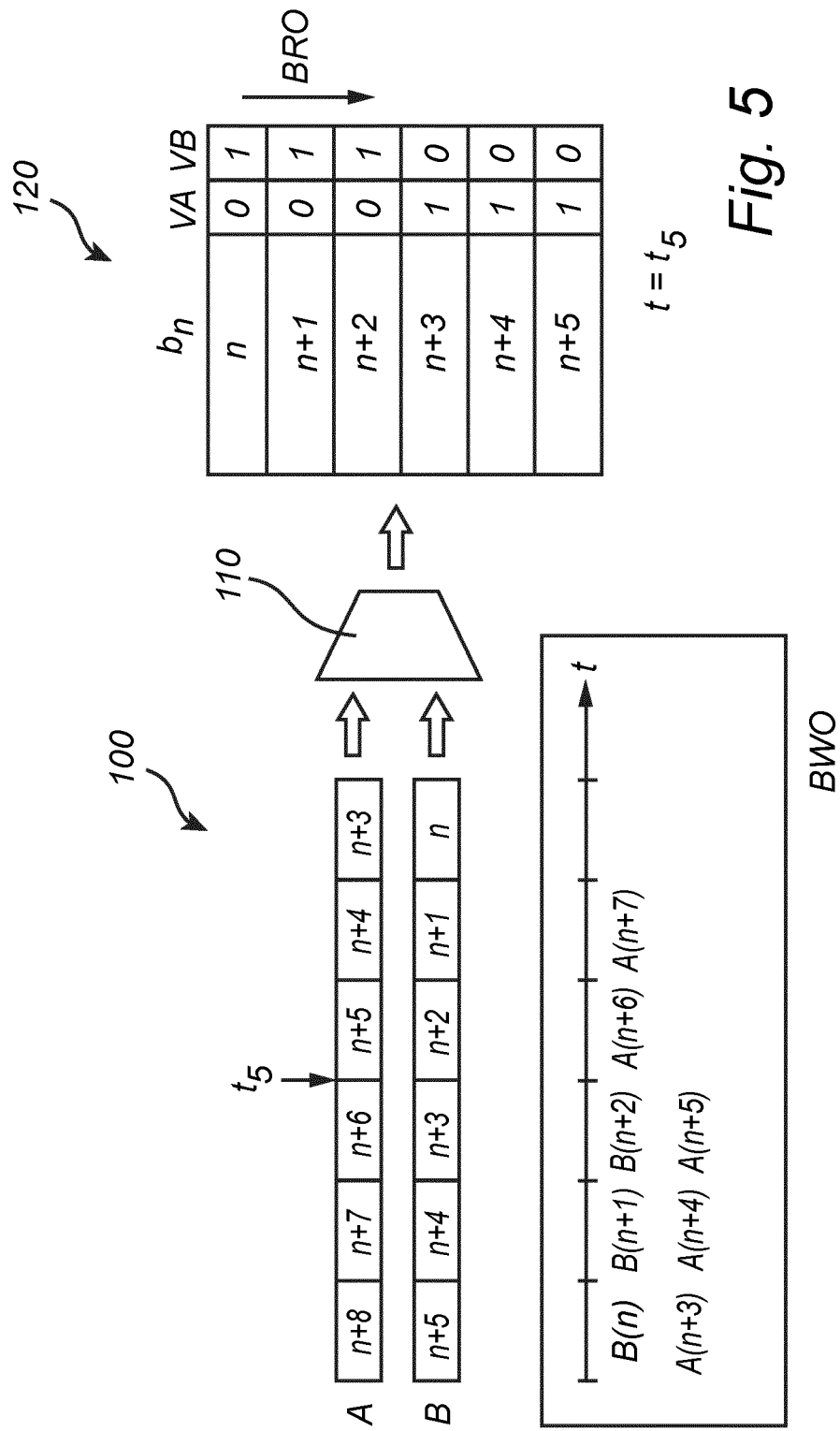

Referring now to FIG. 5, which illustrates concurrent writing to a play-out buffer, both link A and link B may concurrently write to the play-out buffer. That is, the select unit 110 is arranged to support simultaneous selection and writing of received packets or packets having different identifiers, such as sequence numbers, and which are received on different links, here link A and link B. In this example, link A is ahead of link B, but there are packets missing due to some previous failure. The packet with sequence number (n) is written from link B concurrently as the packet with sequence number (n+3) is written from link A. Subsequently, the packet with sequence number (n+1) is written by B concurrently with the packet with sequence number (n+4) being written by link A, and so on according to the play-out buffer writing order BWO. The play-out buffer write order BWO order then have multiple entries for some time instances, as is illustrated in FIG. 5. At a time $t_5$, only link B has delivered packets with sequence numbers n–(n+2), thus for these packets the valid bits for link A, VA, are not set, while the valid bits for link B, VB, are set. First package that will set both valid bit VA and valid bit VB will be the packet with sequence number (n+3) as can be deducted from FIG. 5.

According to an embodiment of the method, valid bits VA, VB, . . . VZ, as recorded in the common buffer for different links A, B, . . . Z, are utilized for controlling forwarding of the data stream into an outgoing link C. In this embodiment, the forwarding of the data stream is initiated a predetermined time after a first frame or packet of the data stream has been received on at least two links. The predetermined time is selected to provide a sufficiently large buffer that covers a maximum supported differential delay of the network.

According to an embodiment of method, valid bits VA, VB, . . . VZ, as recorded for different links A, B, . . . Z, in the common buffer are utilized to monitoring a current redundancy of the node to node communication based on the valid bit entries. Buffer monitoring is performed by, when subsequently forwarding the data stream from the second node, see e.g. node N1 in FIG. 1, for each forwarded packet from the play-out buffer, or play-out queue, the valid bits for links A and B are inspected. If for a packet of a specific sequence number both valid bits VA and VB are set, this implies that both links A and B reached this sequence number before the packet was forwarded from the play out buffer, which thereby indicates that the level of buffering is sufficient to handle a hitless failover. Conversely, if only one bit is set, the amount of buffering is not sufficient and the connection can therefore not be considered to be in a hitless state, i.e. in a state in which a hitless failover can be provided. For node to node communication over multiple links, buffer monitoring as described above can be used to determine single-, double-, triple-, and so on, redundancy of the connection.

According to an embodiment of the present invention, when starting up a node to node communication, taking as an exemplifying system the node to node communication system as described with reference to FIGS. 1 and 2, start-up conditions are handled in the following way: initially neither link A nor link B is up and the connection state is said to be in a non-hitless state. Subsequently, either link A or link B is up. However, not until both channels A and B are up, the differential delay of the two links is measured to be below the supported hitless limit, and if as previously mentioned the packets being forwarded from the play-out queue has both valid bits set the connection state transitions to a hitless state.

In one embodiment, once the first link comes up, it starts writing in the play-out buffer. As the play-out buffer reaches a predetermined occupancy, e.g. 50%, packets start being forwarded. Alternatively, forwarding of the data stream is initiated a predetermined time after a head entry packet has been validated for both incoming links A and B, i.e. VA and VB has been set. The forwarding of the data stream is preferably performed governed by a predetermined send out rate regime as described in embodiments of the invention herein under. Preferably, the send out rate regime is selected so as to maintain the originating sending rate of the data stream. When the second link arrives it can be either ahead of the existing link or behind. If it is ahead, the ahead link will catch up and start filling in entries. If it is behind, the differential delay is established. In one embodiment, if the differential delay is smaller than the maximum supported delay, and this condition is entered within a predetermined time period, e.g. 10 s, from the first connection being established, an automatic hit is introduced to force the connection into a hitless state. However, if the differential delay is smaller than the maximum supported delay, and this condition is entered after the predetermined time period, e.g. 10 s, a manual force hitless operation is required to trigger a hit and make the connection get into a hitless state.

In one embodiment, after a hit has been introduced, both links are available. In such a situation the sequence numbers of the respective links are compared and the link with the lowest sequence number is selected as the one to start writing the play-out buffer and thereby establish a play-out buffer head entry. In another embodiment, random link selection mechanism is employed.

Note that by waiting for the buffer occupancy to reach 50% before forwarding packets into the play-out buffer link, a certain delay is introduced. If the differential delay is smaller than the amount of traffic that 50% buffer occupancy corresponds to, this delay may be more than required to provide hitless failover. For delay sensitive applications it is therefore always recommended to force a hit upon connection setup, such that the amount of buffering and therefore delay can be optimized.

As previously mentioned, in order to decrease jitter/wander in the node to node communications, different send out rate regimes may be employed which will be described herein under for embodiments of the present inventive method.

Figure 6:
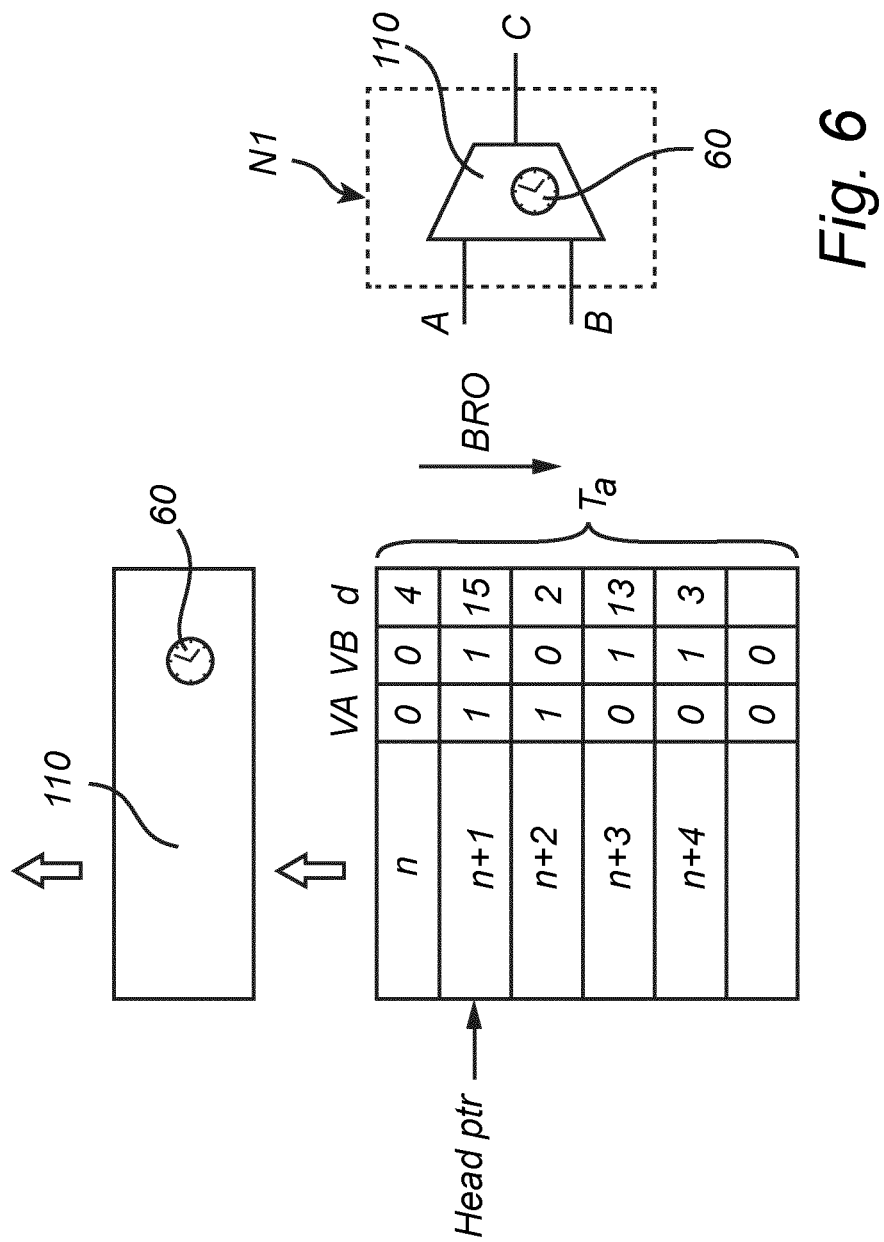

According to an embodiment of the method, in order to decrease jitter/wander in the node to node communication, the packet send out rate from the play-out buffer is controlled so as to maintain the same play-out buffer send out rate as the rate at which packets arrive at the receiving node. Referring now to FIG. 6, the method further comprises to, at the receiving node N1 and for each received packet, record an inter-packet arrival time. Whenever a packet arrives on a link A or B, a cycle counter 60 of the select unit 110 is started, and when the next packet arrives the cycle counter value is recorded and associated with the arriving packet. That is, at the receiving node N1 the number of cycles between arriving packets on each link is recorded. Further, based on the recorded inter-packet arrival time data, the output rate when forwarding the data stream is then determined, for instance by selecting the inter packet arrival time data for the first received packet with a certain sequence number, see example below. The determined time is referred to as the send out delay d. Once a packet becomes head of queue as indicated Head ptr in FIG. 6, and is ready to be sent out, the packet is held for the number of cycles indicated by the send out delay d before being sent out. This mechanism ensures that packets are sent out at the same rate as they arrived. A send out delay sequence $T_a$ can be utilized to describe the send out delay characteristics of packets of a link:

$$T_{a\ link} = [d_{link(n)}, d_{link(n+1)}, \ldots d_{link(N)}].$$

According to an embodiment of the method, the output rate is determined packet by packet, such that for a packet of a specific buffer index $b_n$ the output rate is selected based on a send out delay d of one of the received packets having an identifier corresponding to the specific buffer index. Consider three incoming links A, B, D (not shown). For a packet with a sequence number n+3, at most three send out delays $d_{A(n+3)}$, $d_{B(n+3)}$, $d_{D(n+3)}$ are determined, and here $d_{B(n+3)}$ is selected as send out delay for the packet when being sent out onto the outgoing link C. For the next packet with a sequence number n+4, at most three send out delays $d_{A(n+4)}$, $d_{B(n+4)}$, $d_{D(n+4)}$ are determined, and here $d_{D(n+4)}$ is selected as send out delay for the packet when being sent out onto link C. For the next packet with a sequence number n+5, at most three send out delays $d_{A(n+5)}$, $d_{B(n+5)}$, $d_{D(n+5)}$ are determined, and here $d_{A(n+5)}$ is selected. The resulting send out delay sequence of the play-out buffer for these packets thus corresponds to:

$$T_{a\_C} = [\ldots d_{B(n+3)}, d_{D(n+4)}, d_{A(n+5)} \ldots].$$

According to an embodiment of the method, the output rate when forwarding the data stream from the receiving node is selected based on the recorded inter-packet arrival times from one of the at incoming links. Consider two links A and B that are almost synchronized, i.e. the sequence numbers of packets arriving on the two links A and B are very close to each other, but which links contain some variability in terms of arrival rate. If determining the send out delays on a packet by packet basis, the result of such a condition can be a play-out buffer that is highly interleaved between the two links. Thus, the link C send out rate characteristics may differ quite substantially from the sending rate of either one of the arriving data streams on the respective link A and B. For instance, here packets from link A arrive to the select unit 110 resulting in a determined send out delay sequence of $T_{a\_A}=[15, 2, 15, 2, 15]$. Further, packets from link B arrive resulting in a determined send out delay sequence of $T_{a\_B}=[2, 15, 2, 15, 2]$. Let's assume that the links are almost synchronized and we end up with a play-out buffer link where every other packet is picked from alternating links. The send out delay sequence for the play out buffer then becomes $T_{a\_c}=[15, 15, 15, 15, 15]$, which results in a send out rate for the data stream forwarded in link C, that is very different from the rate of arrival of the packets of the data streams in either link, A or B. This may be undesirable. Here, this is addressed by allowing one of the links to be a primary timing link. For instance, the link that is behind is selected as primary timing link. The primary timing link then overwrites the send out delays of valid play-out buffer entries. Thanks to buffering this will allow the play-out buffer link to get the same delay sequence as the link that is behind. The send out delay sequence then becomes $T_{a\_c}=[15, 2, 15, 2, 15]$ or $[2, 15, 2, 15, 2]$, which results in a send out rate for the data stream forwarded in link C corresponding to the same rate of arrival of the packets of the data streams as either link, A or B. Which link to select as the primary timing link can be selected based on criteria such as: first link that comes up, link that is ahead of the other or based on history information of the link stability or any combination of the abovementioned criteria.

The present inventive method can further advantageously be utilized to enable hitless node upgrades of an intermediary node in a network. With reference now to FIG. 7, an embodiment of a node to node communication system 700 according to the present invention is illustrated when the method is used for in a hitless manner disconnecting a node in a network, for instance in order to upgrade the node. During normal service the first node N0 is connected to the second node N1 via an intermediary node NI. Now, node NI needs to be temporarily disconnected from the network without interrupting services. This is achieved by adding a redundant link NS from the first node N0 to the second node N1 thereby bypassing the node NI to upgrade. The data stream 11 is, as previously described, replicated in the first node N0, and is now sent to the second node N1 via the intermediary node NI and the redundant link NS. Once the connection is confirmed to be hitless, the original connection over the intermediary node NI can be taken down and the intermediary node NI can be upgraded. Once upgraded the original connection over NI is restored and once confirmed hitless the redundant bypass connection NS can be removed. This mechanism provides the ability to take down a node for maintenance without interrupting services.

Figure 8B:
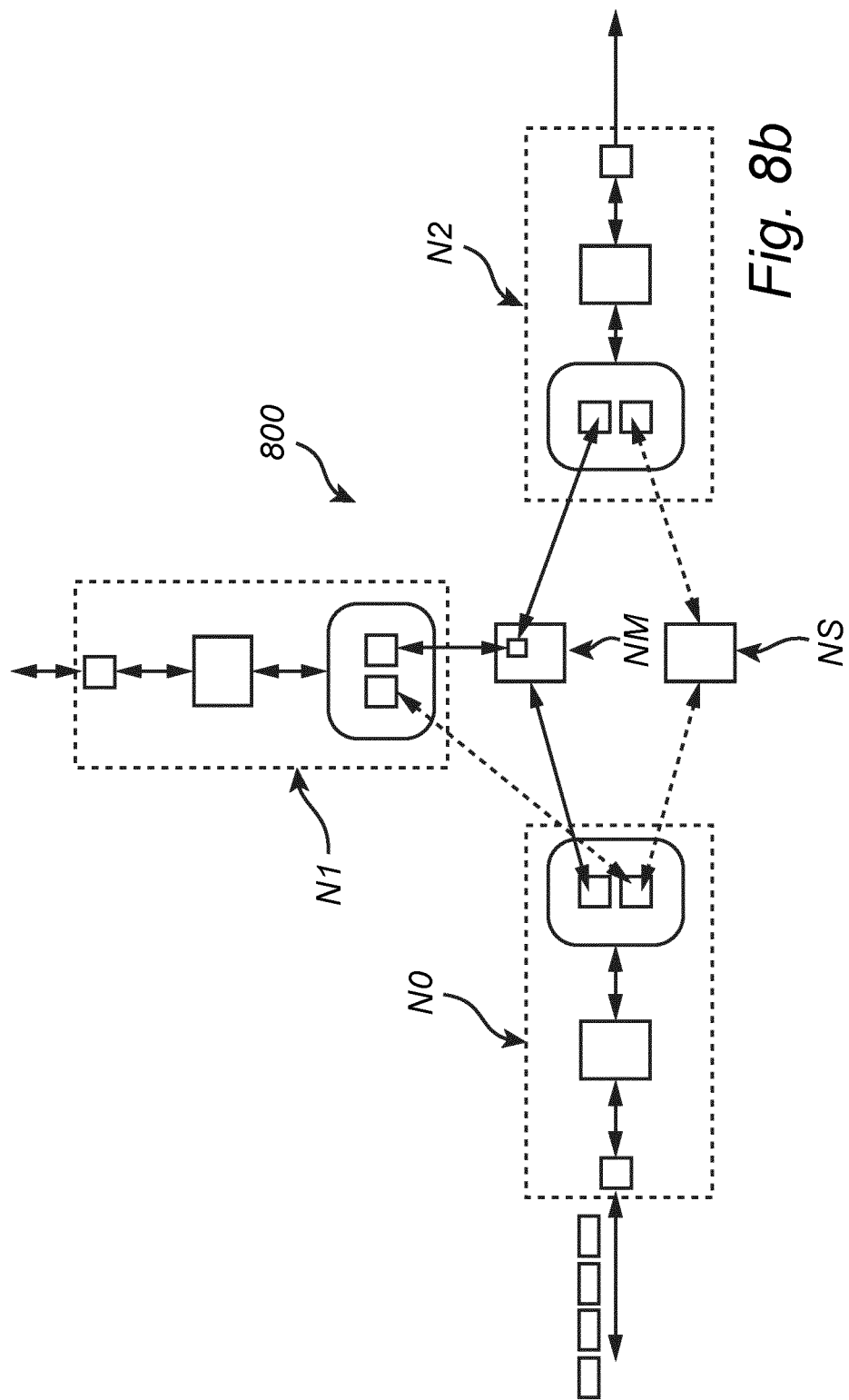

As illustrated in FIG. 8, the present method and system may advantageously be utilized for hitless disconnection of connections in a multicast system. Referring first to FIG. 8a) a multicast node NM branches through a multicast node to node communication network, and is here connected to the first node N0, the second node N1 and a third node N2. To provide a hitless disconnection of the multicast node NM, e.g. for the purpose of upgrading the node, referring now to FIG. 8b), a redundant link NS is added between the first node and the third node. Subsequently a multicast is setup from the first node N0 to the second node N1, and from the first node N0 to the third node N2 (over the redundant link NS). Once both connections are confirmed to be hitless, the multicast node NM can be taken down and be upgraded. Once upgraded the original connections over NM are restored and once confirmed hitless the redundant bypass connection NS can be removed, and the multicast channel from the first node N0 is taken down.

Embodiments of the present inventive method are preferably implemented in a node to node communication by means of a software module adapted to perform the method of the present invention (not shown). The software module may be integrated in the node comprising suitable processing means and memory means, or may be implemented in an external device comprising suitable processing means and memory means, and which is arranged for interconnection with an existing node.

The person skilled in the art realizes that the present invention by no means is limited to the embodiments described above. On the contrary, many modifications and variations are possible within the scope of the appended claims. Further, it must be noted that the inventive method is applicable in node to node communication and hitless node upgrading in any suitable network, also in synchronous networks.

The invention claimed is:
1. A method for node to node communication comprising:
providing each packet of a data stream to be transferred with a respective identifier, wherein the identifier corresponds to a relative position of a packet in said data stream;
transporting over at least two links replicated data of said data stream from a transmitting node to a receiving node; at said receiving node,
receiving and buffering packets from said at least two links for subsequent forwarding of said data stream;
wherein indentif said buffering includes reconstructing a predetermined portion of said data stream in a single common indexed buffer, based on received packets from at least one of said at least two links.

2. A method according to claim 1, wherein said step of reconstructing includes,
  selecting only one received packet with a specific identifier for writing to each indexed position of said buffer.

3. A method according to claim 1, further comprising:
  for each received packet,
    determining a corresponding buffer index, based on the identifier of said received packet;
    checking if data has been written to the corresponding buffer index position, based on the determined buffer index, and
    writing the received packet or a corresponding pointer to said received packet to its determined buffer index position, based on a determination that the data has not been written to the corresponding buffer index position.

4. A method according to claim 2, wherein simultaneous selection and writing to said buffer of received packets having different identifiers and being received on different links is supported.

5. A method according to claim 2, further comprising:
  for each received packet, setting a valid bit entry corresponding to a determined buffer index and link.

6. A method according to claim 5, further comprising:
  monitoring a current redundancy of said node to node communication based on said valid bit entries.

7. A method according to claim 5, further comprising:
  dropping any received packet arriving after a received packet with the same identifier is recorded.

8. A method according to claim 1, further comprising:
  at said receiving node and for each received packet,
    recording an inter-packet arrival time;
    wherein said forwarding of said data stream is performed with an output rate, the output rate being determined based on recorded inter-packet arrival time data.

9. A method according to claim 8, wherein,
  said output rate is determined packet by packet, such that for a packet of a specific buffer index, the output rate is selected based on a recorded inter-packet arrival time of one of the received packets, the one of the received packets having an identifier corresponding to said specific buffer index.

10. A method according to claim 8, wherein the output rate when forwarding the data stream is selected based on recorded inter-packet arrival times from one of said at least two links.

11. A method according to claim 1, wherein forwarding of said data stream is initiated a predetermined time after a first packet of said data stream has been received on at least two links.

12. A method according to claim 1, wherein said method is used for hitless disconnection of an intermediary node arranged in one of said at least two links.

13. A non-transitory computer readable storage medium storing computer-readable instructions executable by a processor to cause the processor to perform the method according to claim 1.

14. A node in a communication system arranged for node to node communication over at least two links, the node comprising:
  a memory storing computer-readable instructions; and
  a processor configured to execute the computer-readable instructions to,
    receive packets of a data stream, wherein each packet includes a respective identifier, and wherein said identifier corresponds to a relative position of a packet in said data stream;
    buffer the packets of the data stream, wherein said buffering of packets includes reconstructing a predetermined portion of said data stream in a single common indexed buffer, using received packets from at least one of said at least two links; and
    transport replicated data of said data stream over said at least two links to a receiving node.

* * * * *